United States Patent [19]

Sauron et al.

[11] Patent Number: 4,714,258

[45] Date of Patent: Dec. 22, 1987

[54] BALANCED ROTARY SEAL ENSURING TIGHTNESS OF A HYDRAULIC TURBINE SHAFT

[76] Inventors: Albert Sauron, 6 Rue des Moissons, 38170 Seyssins; Alexandre Smetanine, 20 Place Louis Jouvet, 38100 Grenoble, both of France

[21] Appl. No.: 823,428

[22] Filed: Jan. 28, 1986

[30] Foreign Application Priority Data

Feb. 1, 1985 [FR] France ................................ 85 01603

[51] Int. Cl.$^4$ ........................ F01D 25/18; F16J 15/34
[52] U.S. Cl. ................................ 277/72 R; 277/74; 277/93 SD; 415/111
[58] Field of Search .................. 277/27, 28, 135, 3, 277/DIG. 8, 74, 72 R, 72 FM, 81 R, 96.1, 93 R, 93 SD; 415/110, 111

[56] References Cited

U.S. PATENT DOCUMENTS

| | | | |
|---|---|---|---|
| 2,036,308 | 4/1936 | Vroom | 277/74 |
| 2,300,385 | 10/1942 | Kollberg et al. | |
| 2,469,588 | 5/1949 | Aschauer | 277/74 X |
| 2,621,946 | 12/1952 | Jendrassik | |
| 2,679,412 | 5/1954 | Whitfield | 277/74 |
| 2,736,265 | 2/1956 | Higgins | 277/74 X |
| 3,926,442 | 12/1975 | Muller | 277/3 |

FOREIGN PATENT DOCUMENTS

| | | | |
|---|---|---|---|
| 3012024 | 10/1981 | Fed. Rep. of Germany | 277/3 |
| 1418240 | 10/1965 | France | 277/74 |
| 2013288 | 8/1979 | United Kingdom | 277/27 |

Primary Examiner—Allan N. Shoap
Attorney, Agent, or Firm—Dowell & Dowell

[57] ABSTRACT

A balanced rotary seal assembly for positively adjusting the seal between a rotating shaft such as a hydraulic turbine shaft having rotary components carried thereby and the surrounding non-rotating machine elements wherein the seal assembly includes a plurality of counteracting pressure applying and fluid conduit devices which are radially spcaed about the axis of the shaft so that an adjustable and variable force is uniformly created so as to regulate the engagement of a pair of annular seal elements against an annular wear plate carried by the rotary components of the turbine and wherein fluid flow to the seal elements and wear plate is generally insured whenever the rotary components are moved relative to the seal elements.

9 Claims, 2 Drawing Figures

BALANCED ROTARY SEAL ENSURING TIGHTNESS OF A HYDRAULIC TURBINE SHAFT

BACKGROUND OF THE INVENTION

1. Field of the Invention

The present invention relates to the tight sealing of vertical shafts, particularly rotary driven shafts of the type used in hydraulic machines such as turbines.

2. History of the Invention

The seal between the vertical rotary driven shaft of such machines and the fixed parts adjacent thereto raises delicate problems. A defective or loose seal brings about disastrous economic consequences from the standpoint both of repairs and of down time of the machine.

When the shaft of the hydraulic turbine is vertical, the seal adapted to ensure a tight seal between the fixed and mobile parts of the turbine is constituted by an annular wear plate or ring associated with the rotating part of the turbine which is abutted on opposite sides by continuous annular seal elements of rectangular section, generally made of carbon. These annular seal elements are mounted on a fixed ring which is movable axially with respect to the shaft. This ring which constitutes the seal-holder is loaded or urged into abutting engagement with the wear plate by a series of compression springs distributed equally about the geometric axis of the shaft of the machine. In addition, there exists an annular chamber which is filled with liquid under pressure. The liquid, which is generally clean water, is directed from the chamber into the space between the sealing elements so as to lubricate and cool them. This water is at a pressure higher than that prevailing in the enclosure of the wheel of the turbine, so that there is a permanent leakage in the direction of the enclosure.

Known seals present considerable drawbacks. In fact, when a turbine-like machine is shut off, the springs associated with the seals apply a constant force which tends to urge the annular seal elements against the wear part or plate. This presure is even greater when the machine is shut off and the supply of spray water is accidentally cut off. Under these conditions, when the machine is started up again, there is very frequently a deterioration of the seals created by the increases in frictional forces when the seal elements are dry. It will be readily understood that this drawback is very serious since replacement of seal elements involves a complete dismantling of all the parts of the machine located above the wear plate.

When the turbine is shut off, the dirty water which surrounds the turbine wheel may penetrate between the two seals, if, for example the outer one, is scratched. The result is that the dirty water passes into the circular chamber where it stagnates resulting in impurities being deposited therein which impurities or deposits often damage the seals of the circular chamber. If this is the case, the seals must be changed and, as their diameters are of the order of two meters, the difficulty and cost of such an operation will be readily appreciated.

SUMMARY OF THE INVENTION

The improvements forming the subject matter of the present invention aim at overcoming these drawbacks by producing a rotary seal which responds better than heretofore to the various desires or needs of the art.

The present invention further aims at producing a balanced seal, i.e. one which undergoes a specific pressure due to the resultant of two counteracting efforts, one comprising the force developed jointly by an assembly of hydraulic piston elements and compression springs, while the counteracting force is exerted by elastic washers. In this way, the stability of the seal is improved and its destruction in the event of failure by not spraying with clean water is limited. In fact, the resultant specific pressure on the seal is regulated so that, even when dry, this pressure is very low. Therefore, if the turbine is switched on without clean spray water, the specific pressure is not sufficient to provoke heating and destruction of the seal. When the spray water is applied to the seal, the pressure of abutment of the annular seal elements on the wear part or plate is automatically increased, however, the spraying and cooling of the seal elements are ensured.

To this end, the seal compression or seating device according to the invention comprises, in combination:

a hollow column of which one of the ends is secured to the seal-holder, while its opposite end projects above the bearing support of the machine;

a compression spring acting on this column in the direction of the seal-holder;

a hydraulic single-acting piston element which is fitted on the hollow column with its cylinder being fixed on the top of the bearing support;

a stack of elastic washers which are compressed when the hollow column is displaced in the direction opposite the action of the hydraulic piston elements;

and a supply of pressurized fluid which passes through the axial bore of the hollow column, and to which the pressure chamber of the hydraulic piston is connected.

The invention will be more readily understood on reading the following description with reference to the accompanying drawings.

DESCRIPTION OF THE PREFERRED EMBODIMENT

Figure 1:
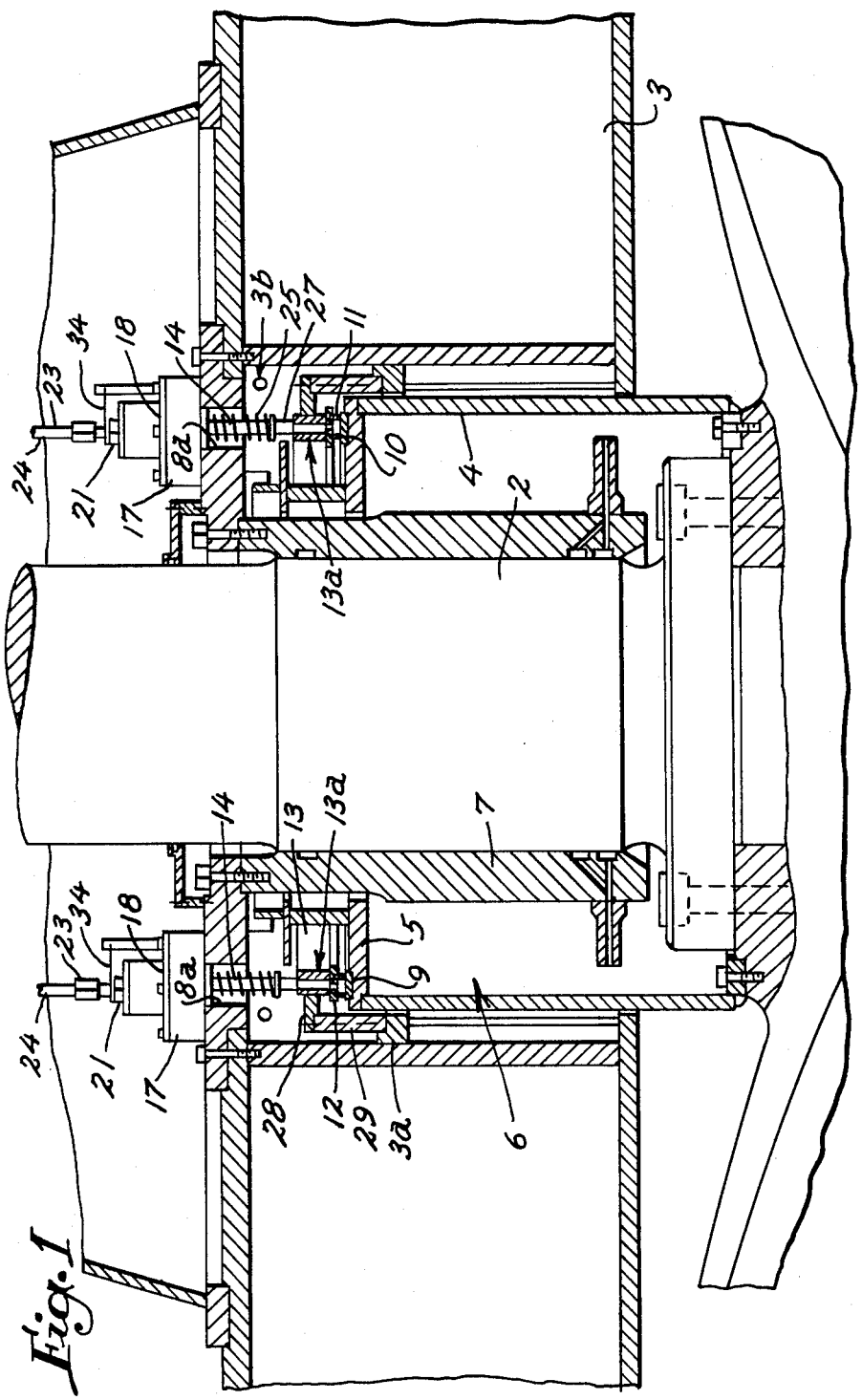
FIG. 1 is a general transverse section through a hydraulic machine provided with a rotary seal according to the invention.

Referring now to the drawings, FIG. 1 shows a hydraulic machine comprising a turbine wheel 1 provided with a vertical shaft 2 passing through an upper cheek 3 with respect to which a tight seal must be ensured. In fact, such a tight seal exists between a ferrule 4 including an annular cover 5 and a chamber 6 filled with oil for lubricating a bearing 7 and other members. This bearing is supported by a support 8 in the form of an annular flange supported by the upper member of cheek 3.

The chamber cover 5 supports an annular rotary wear part or plate 9 which is conventionally seated by means of a seal mounted on the bearing support 8.

Figure 2:
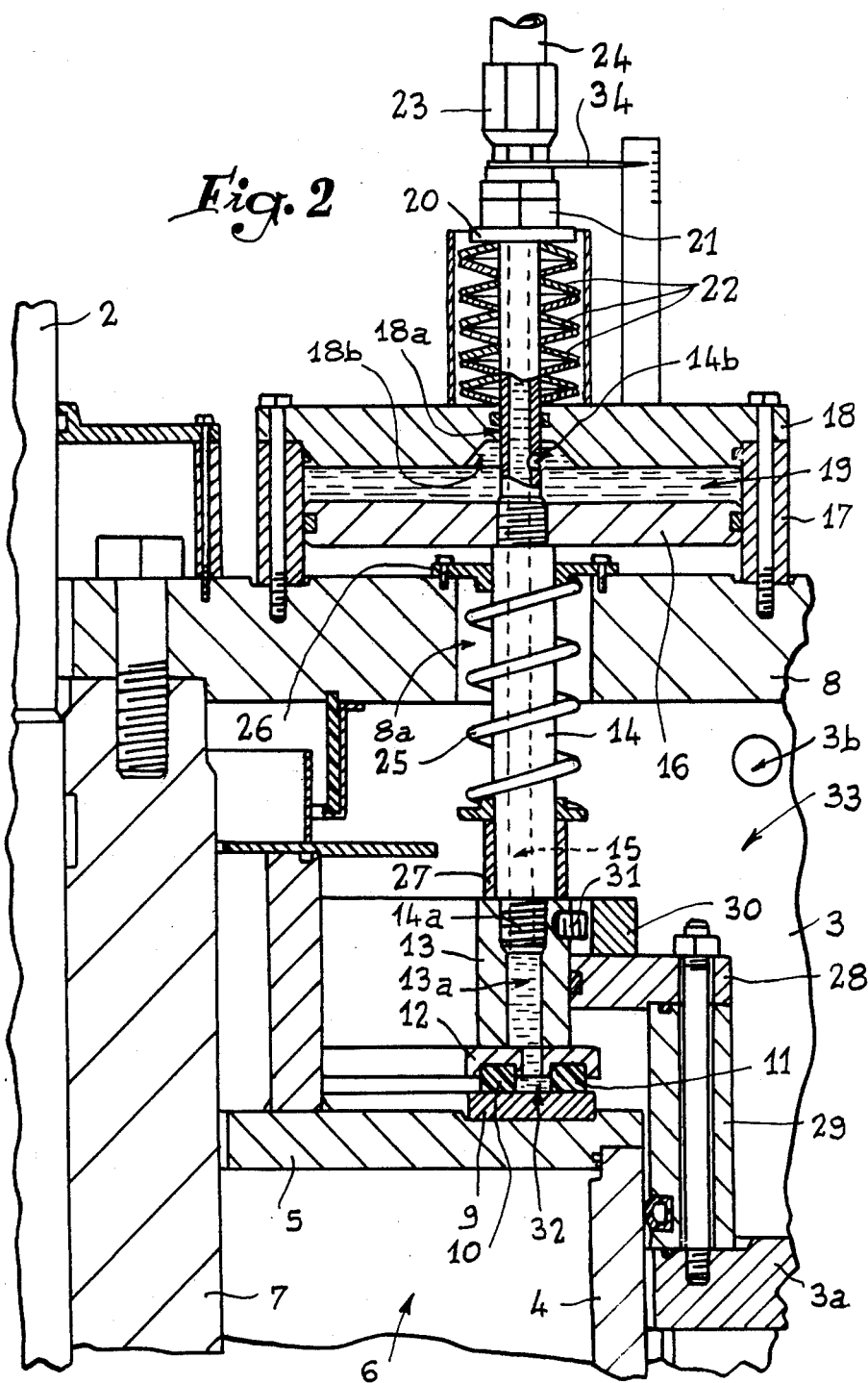
FIG. 2 is a view in detail on a larger scale.

According to the invention and as illustrated in detail in FIG. 2, a tight seal is ensured by providing two concentric seals 10 and 11 of carbon or the like which are supported by a seal-holder 12 disposed at the base of an axially movable ring 13. A plurality of seal seating devices are equally spaced about the geometric axis of the machine axis. The use of six equally spaced seating devices is considered as satisfactory in the majority of cases encountered.

Each of the seating devices illustrated more particularly in FIG. 2 is essentially composed of a column 14 of which the lower end 14a is screwed in the ring 13. The column passes through the bearing support 8 in an opening 8a. It will be observed that column 14 comprises a longitudinal bore 15 terminating in a vertical hole 13a made in the ring 13. A piston 16 is fitted on column 14 above bearing support 8 and its periphery cooperates with a cylinder 17 closed by a bottom or plate 18 which the column traverses in tight manner by way of a central perforation 18a. Seals are, of course, provided between the piston and the plate 18 on the one hand and the cylinder 17 on the other hand to render the space between the piston and the plate, which define a water chamber 19 therebetween, tightly sealed. Above plate 18, column 14 includes a washer 20 which is applied against a stop nut 21 by a stack of elastic washers of the "Belleville" type. This stack has been referenced 22. That end of column 14 which lies above stack 22 is provided with a connection 23 to which is connected a pipe 24 for conveying clean water for spraying and cooling the seals 10 and 11. Water chamber 19 is suppled with water from bore 15 by way of a radial hole in 14b made in the column and which opens out in a well 18b concentric to the central perforation 18a of the plate 18.

A compression spring 25 is placed about the column so that one of its ends abuts against a flange 26 secured with the bearing support 8 and so that the other end thereof abuts against a bush 27 abutting on ring 13. In this way, the reaction of the spring 25 loads or urges the ring 13, the seal-holder 12 and the seals 10 and 11 against the wear part 9.

It will be noted that ring 13 is guided in its axial displacement by an annular bearing 28 secured with a tubular element 29 assembled with a member 3a of the upper cheek 3. Bearing 28 includes forks 30 having tines which overlap catches 31 made on the periphery of the ring 13. In this way, the latter is retained angularly fixed so that no rotation is communicated to columns 14.

Operation follows from the foregoing explanations:

At rest, i.e. when the turbine wheel is not turning, spring 25 urges the two seals 10 and 11 against the wear part 9 at a specific pressure between these parts. Stack 22 of elastic washers of the Belleville type is then arranged so as not to apply any counter-force on column 14. Nut 21 is then screwed so that the stack of washers is compressed in order to exert a counteracting force on the column with respect to the reaction which is imparted thereto by compression spring 25. In fact, the pressure of seals 10 and 11 against the wear part 9 is adjusted to be just slightly greater than 0, i.e. varying between 0.5 and 0.1 bar.

Three types of mishaps may occur:

Although safety devices are provided so that the turbine wheel will not turn without spray water, the safety systems may deteriorate thereby allowing the turbine to start to turn without spray water. The seals are in that case directly applied against the wear part without any film of water existing therebetween. However, due to the adjustment indicated above, the pressure of the seals against the wear part is low, with the result that the rotating contact therebetween reduces the thickness of the plate a minor amount. Such erosion or destruction is very rapidly countered or resisted by the reaction of the Belleville washers which, after a certain downward stroke of column 14, separates the seals and the wear part 9. At that moment, it is the water from the compartment of wheel 1 which lubricates the seals and cools them, this preventing them from deteriorating completely.

In the second case, the spray water is not cut off but, due to other circumstances, the seals may be in direct abutment without any film of water existing between the wear plate or part. In that case, the force applied on seals 10, 11 is constituted by the reaction of the compression springs 25 and the force developed by the hydraulic piston 16. These two forces are countered on the one hand by the tension of the stack 22 of Belleville washers and, on the other hand, by the pressure developed between seal-holder 12 and wear part 9, i.e. the pressure developed in the space 32 between the two seals 10 and 11.

In fact, seals 10 and 11 are separated by an appreciable distance, with the result that the force developed between the seals and the wear part 9 by the water arriving in the space 32 between these two seals is high, with the result that there is much less risk of promoting sticking of the seals on the wear part than with prior structures in which the seals were close to each other, with the result that the force in question was low.

As in the first case hereinabove, when starting up the machine, there is a slight wear of the seals if they are in "dry abutment" against part 9, but as soon as this wear reaches a certain value, the downward stroke of columns 14 is stopped thanks to the intervention of the stack 22 of Belleville washers. Under these conditions, a clearance appears between the seals and the wear part with the result that a film of water is created, so that, from that instant, operation becomes normal again.

A third hypothetical case of malfunctioning is an untimely separation of seals 10, 11 from the wear part or plate 9, for example in response to transitory vibrations which separate these seals so that foreign material can be introduced therebetween. It will be readily appreciated that, in that case, the film of water disappears, leaving a flow of considerable volume. In that case, the columns 14 tend to rise, so that they cancel the reaction of the stack of Belleville washers 22. Consequently, the reaction of the springs 25 and the forces developed by hydraulic piston 16 are added, constituting a considerable force acting downwardly on the columns which allows elimination of the foreign body and return to normal position of the seals with respect to the wear part with an appropriate film of water therebetween.

It goes without saying that the seal described is not of the hermetic type, all the more so as the pressure of the water arriving in column 14 is provided to be greater by at least 1 bar than that prevailing in the compartment of the chamber of the turbines. In this way, in operation, there is a constant flow of the spray water leaking towards an annular compartment 33 located around the bearing 7 and thereabove. Under these conditions, it is desirable to provide an overflow 3b in the upper cheek which is adapted for evacuating any water entering therein.

The resultant pressure between the seals and the wear part is reflected by pointer or scale 34 and may be adjusted equally so that all the springs 25 present identical characteristics. In fact, the penetration of the stacks 22 noted on the pointer gives a resultant pressure.

During long periods when the turbine is shut off, during which the lubrication and cooling water is not used, water-soluble products such as oil may be introduced into the water chamber 19 in order to protect the seals of the piston and cylinder from any deposit of dirt coming from the water in the compartment of the turbine wheel and which could enter the chambers of the hydraulic piston due to the very low pressure existing between seals 10 and 11 and wear part 9. One of the serious drawbacks of the presently known arrangements in which such introduction of soluble products is not possible, is thus avoided.

It must, moreover, be understood that the foregoing description has been given only by way of example and that it in no way limits the domain of the invention which would not be exceeded by replacing the details described by any other equivalents.

What is claimed is:

1. A seal assembly for sealing a rotary driven shaft having rotary driven components movable therewith from adjacent non-rotating components and wherein an annular erodable wearing plate is movably carried by the rotary driven components so as to be oriented in surrounding relationship to the drive shaft, the seal assembly comprising a pair of concentric annular seal means, holder means for supporting said annular seal means against the annular wearing plate so as to create an annular space between said annular seal means which is in fluid communication with the wear plate, a plurality of fluid conveying means oriented about the rotary driven shaft, means for connecting each of said fluid conveying means to said holder means so as to be in communication with said annular space between said annular seal means, a first force applying means for selectively urging said holder means and said annular seal means against the annular wear plate, second counteracting force means operably connected to adjust the movement of said holder means, said second couteracting force means limiting the movement of said holder means and said annular seal means against the wear plate by counteracting the pressure applied thereto by said first force applying means, and means for supplying fluid through said fluid conveying means so as to lubricate and cool the area of contact between said annular seal means and the wear plate.

2. The seal assembly claim 1 in which said first force applying means includes spring means mounted adjacent to each of said fluid conveying means and a fluid piston means mounted to each of said fluid conveying means, each of said spring means and said fluid piston means urging said holder means and said annular seal means toward the annular wear plate.

3. The seal assembly of claim 2 in which each of said fluid piston means includes a fluid chamber surrounding one of said fluid conveying means, a movable piston mounted to said one of said fluid conveying means and defining an expansible wall of said fluid chamber, and an opening between said fluid conveying means and said fluid chamber whereby fluid supplied to said fluid conveying means is also applied to said fluid chamber.

4. The seal assembly of claim 3 in which said second counteracting force means includes second spring means mounted adjacent each of said fluid conveying means, adjustable nut means carried by each of said fluid conveying means, each of said second spring means engaging said nut means so as to urge said fluid conveying means away from the wear plate, each of said nut means being adjustable to regulate the force exerted by said second spring means on said fluid conveying means.

5. The seal assembly of claim 4 in which each of said second spring means includes a plurality of belleville spring elements arranged in a stack and encircling each of said fluid conveying means.

6. The seal assembly of claim 5 in which said fluid conveying means are hollow tubular members.

7. The seal assembly of claim 1 in which said means for connecting said fluid conveying means to said holder means includes an annular ring element having an opening therethrough, each of said fluid conveying means being mounted within the opening through said annular ring element.

8. The seal assembly of claim 1 in which said holder means extends inwardly of said annular space between said seal means, said annular space between said seal means being of a width to permit a significant force to be developed by fluid between said holder means and the wear plate and directed in the direction of said counteracting force developed by said second counteracting force means.

9. A rotary seal assembly for balancing the forces exerted against an annular wear plate which is rotatably carried by a rotary component surrounding the driven shaft of a turbine comprising a pair of annular seal elements which normally engage the wear plate, annular holder means for supporting said seal elements in spaced concentric relationship to one another so as to create an annular fluid channel therebetween which is in direct communication with the wear plate, a plurality of hollow column members having first and second ends, said first ends of said hollow column members being connected to said holder means so as to be in open communication with said annular fluid channel, said hollow column members being generally equally spaced about the driven shaft, a compression spring means adjacent each of said hollow column members and acting to urge said hollow column members and said seal elements toward the wear plate, a fluid chamber surrounding each of said hollow column members so as to be in fluid communication therewith, a movable hydraulic piston member carried by each of said hollow column members and forming an expansible wall of said fluid chamber so as to urge said hollow column member and said seal elements toward the wear plate when fluid is introduced into said fluid chamber, and a stack of counteracting spring elements surrounding each of said second ends of said hollow column members so as to exert a force in a direction opposing said compression springs and said hydraulic piston members, and means carried by said second ends of said hollow column members for adjusting the force exerted by said counteracting spring elements, whereby said seal elements are balanced in the engagement with the wear plate.

* * * * *